United States Patent Office 3,629,361
Patented Dec. 21, 1971

3,629,361
CURABLE POLYEPOXIDE COMPOSITIONS CONTAINING POLYMERS OF CYCLIC ESTERS
Anthony C. Soldatos, Kendall Park, N.J., assignor to Union Carbide Corporation, New York, N.Y.
No Drawing. Filed Apr. 1, 1969, Ser. No. 812,312
Int. Cl. C08g 45/06
U.S. Cl. 260—830 R      18 Claims

ABSTRACT OF THE DISCLOSURE

This invention relates to curable polyepoxide compositions, containing a polymer of a cyclic ester, which exhibit excellent mold-release properties and excellent flow and when cured to infusible products are characterized by excellent heat distortion temperatures.

---

This invention relates to curable polyepoxide compositions, containing a polymer of a cyclic ester, and to cured products obtained therefrom. More particularly, this invention relates to curable polyepoxide compositions, containing a polymer of a cyclic ester, which are characterized by excellent flow and when cured to infusible products, by excellent physical properties such as excellent heat distortion temperatures. The compositions of this invention, in addition to being characterized by the excellent properties noted above, exhibit excellent mold-release properties and are therefore particularly desirable for use in molding applications to form shaped articles of desired configuration.

The compositions of this invention comprise a polyepoxide having more than one epoxy group per molecule and a polymer of a cyclic ester wherein the polymer of a cyclic ester is present in an amount of about 0.5 percent to about 50 percent by weight, preferably about 1 percent by weight to about 25 percent by weight based on the weight of the polyepoxide.

The polyepoxides which can be used in accordance with this invention are those organic compounds having an epoxy equivalency of greater than one, that is, compounds having an average of more than one epoxy group, per molecule. These compounds, wherein the oxygen of the epoxy group is attached to vicinal carbon atoms, can be saturated or unsaturated, aliphatic, cycloaliphatic, or heterocyclic, and can be substituted, with substituents such as halogen atoms, alkyl groups, ether groups and the like.

Illustrative of polyepoxides which can be used in accordance with this invention are the polyglycidyl ethers of polyhydric phenols, exemplified by the polyglycidyl ethers of such phenols as the mononuclear polyhydric phenols, resorcinol and pyrogallol; the di- or polynuclear phenols, such as the bisphenols described in Bender et al., U.S. Patent 2,506,486 and polyphenylols such as the novolac condensation products of a phenol and a saturated or unsaturated aldehyde containing an average of from 3 to 20 or more phenylol groups per molecule (cf. "'Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,855,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylidene or sulfone. The connecting groups are further exemplified by bis-(p-hydroxyphenyl)methane, 2,2 - bis - (p - hydroxyphenyl)propane and dihydroxydiphenyl sulfone.

Process for the preparation of polyglycidyl ethers of polyhydric phenols is described in detail in the Bender et al. patent (supra) and U.S. Patent 2,801,989 to A. G. Farnham.

Particularly desirable for purposes of this invention are the polyglycidyl ethers of the bis-(hydroxyphenyl)alkanes, as for example, the diglycidyl ether of 2,2-bis-(p-hydroxyphenyl)propane and the diglycidyl ether of bis-(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylenediamine, p-phenylenediamine, 4,4'-diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N - diglycidyl - 2,6 - dimethylaniline, N,N,N',N' - tetraglycidyl - 4,4' - diaminodiphenyl methane, the triglycidyl derivative of p-aminophenol wherein the aminohydrogen and OH hydrogen atoms are replaced by glycidyl groups. Polyglycidyl derivatives of aromatic amines and amino phenols and methods for their preparation are further described in U.S. Patents 2,951,825 and 2,951,822 to N. H. Reinking and N. H. Reinking et al., respectively. The so-called peracetic acid epoxides which are obtained by epoxidation across a double bond, such as bis-(2,3-epoxycyclopentyl)ether, 3,4-epoxy-6-methyl-cyclohexylmethyl - 3,4 - epoxy - 6 - methyl - cyclohexane carboxylate, vinylcyclohexane dioxide, dicyclopentadiene dioxide and the like are also suitable.

Polymers of cyclic esters which are contemplated in the practice of this invention are those which possess a reduced viscosity of at least about 0.1 preferably about 0.15 to about 15 and higher. The preferred polymers of cyclic esters have a reduced viscosity of about 0.3 to about 10.

Suitable polymers are further characterized by the following recurring structural Unit I:

Unit I

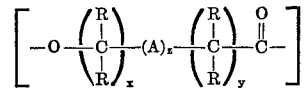

wherein each R, which can be the same or different, is hydrogen, halogen, i.e., chlorine, bromine, iodine or fluorine, or a monovalent hydrocarbon radical generally containing a maximum of 12 carbon atoms and preferably containing a maximum of 8 carbon atoms; A is an oxy group; $x$ is an integer having a value of 1 to 4 inclusive; $y$ is an integer having a value of 1 to 4 inclusive; $z$ is an integer having a value of 0 or one; with the provisos that (a) the sum of $x+y+z$ is 4 to 6 inclusive and (b) the total number of R variables which are substituents other than hydrogen does not exceed 3 and preferably does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, choropropyl and the like; alkoxy radicals such as methoxy, ethoxy, n-propoxy, n-hexoxy, n-dodecoxy and the like; aryl radicals such as phenyl, ethylphenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters which are contemplated are characterized by both recurring structural Unit I supra and recurring structural Unit II:

Unit II 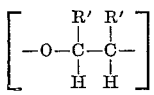

wherein each R', is as defined for R of Unit I or in which the two R' variables together with the ethylene moiety of the oxyethylene chain of Unit II form a saturated cycloaliphatic hydrocarbon ring having from 4 to 8 carbon atoms inclusive, preferably from 5 to 6 carbon atoms inclusive. It is preferred that recurring Unit II contains from 2 to 12 carbon atoms inclusive.

The aforedescribed recurring Unit I is interconnected through the oxy group (—O—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infra-red analysis which factor is readily understandable since macromolecules are involved. On the other hand, the relatively low molecular weight cyclic ester polymers, e.g., those having reduced viscosity values below about 0.3 are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. It may be desirable to convert the hydroxyl and carboxyl end groups, if present, by esterification or acylation techniques by reacting the hydroxyl moiety with a monocarboxy compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic comonomer which is copolymerizable therewith, e.g., as alkylene oxide, the polymeric chain of the resulting copolymeric product will be characterized by both recurring Unit I supra as well as the recurring Unit II (which would represent the alkylene oxide comonomer polymerized therein). The interconnection of Unit I and Unit II supra does not involve or result in the direct bonding of two oxy groups, i.e., —O—O—. In other words, the oxy group (—O—) of recurring Unit II is interconnected with the carbonyl group

of recurring Unit I supra or with the alkylene moiety of a second oxyalkylene Unit II.

Particularly preferred polymers of cyclic esters are those which are characterized by the oxypentamethylenecarbonyl chain as seen in recurring structural Unit III:

Unit III 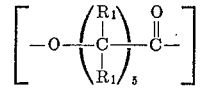

wherein each $R_1$ is hydrogen or lower alkyl, that is, alkyl having a maximum of 4 carbon atoms, preferably hydrogen or methyl, with the proviso that no more than three $R_1$ variables are substituents other than hydrogen.

The preparation of the cyclic ester polymers are well documented in the patent literature as exemplified by U.S. Patent Nos. 3,021,309 through 3,021,317; 3,169,945; and 2,962,524. Briefly, the process involves the polymerization of an admixture containing at least one cyclic ester monomer with or without a functional initiator therefor, and a suitable catalyst, the choice of which will depend on the presence or absence of added initiator.

Suitable monomeric cyclic esters which can be employed in the manufacture of the cyclic ester polymers are best illustrated by the following formula:

Formula I 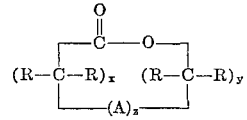

wherein the R, A, x, y, and z, variables have the significance noted in Unit I supra.

Particularly desirable cyclic esters which can be employed in the manufacture of the cyclic ester polymers are those having the formula:

Formula II 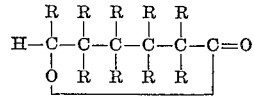

wherein R is as previously defined and at least six R's are hydrogen.

Representative monomeric cyclic esters which are contemplated include, for example, delta-valerolactone; epsilon-caprolactone; zeta-enantholactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy-delta-valerolactones and epsilon-caprolactones.

Among specific ε caprolactones falling within the scope of Formula II can be noted: ε caprolactone, β-methyl-ε caprolactone, γ-methyl-ε caprolactone, δ-methyl-ε caprolactone, ε-methyl-ε caprolactone, β,δ-dimethyl-ε caprolactone, β-chloro-ε caprolactone, γ-ethoxy-ε caprolactone, ε phenyl-ε caprolactone and the like.

A single cyclic ester monomer or mixtures of such monomers can be employed, if so desired.

In the absence of added functional initiator, the polymerization process is desirably effected under the operative conditions and in the presence of anionic catalysts as noted in U.S. 3,021,309 to U.S. 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-groups. Carboxyl substituents on the initiator will result in polymeric products having carboxyl end-groups. The initiator sans the active hydrogen atom will thus be contained in the final polymeric molecule. The esterification or acylation of the aforementioned end-groups has been described previously and is voluminously documented in the art.

Polymers of cyclic esters can also be manufactured via the process described in U.S. Pat. No. 2,962,524. In this process, a monomeric admixture comprising cyclic ester and alkylene oxide which desirably has the formula:

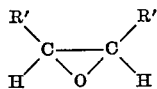

wherein each R', individually, have the meanings noted in Unit II supra, can be reacted with a polyfunctional initiator possessing amino, hydroxyl, and/or carboxyl groups, preferably in the presence of a Lewis acid catalyst such as boron trifluoride. The resulting polymeric products have hydroxyl termination which can be converted to acyloxy or hydrocarbyloxy moieties by conventional techniques. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0) in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such cyclic ester/alkylene oxide copolymers.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity is a value obtained by dividing the specific viscosity" by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

It is to be noted that mixtures of polyepoxides and/or polymers of cyclic esters can be used.

Also, the disclosure of all references noted in this application are incorporated herein by reference.

The compositions of this invention can be cast, molded or otherwise formed into shaped articles of desired shape and cured to infusible products by heating at elevated temperatures. The heating cycle will, of course, vary and depend, in part, upon the exact formulation of the composition.

In formulating compositions which are to be formed into shaped articles, it is customary to add thereto curing agents, prior to the heating cycle in order to effect a cure in a reasonable period of time. Any of the epoxy curing agents can be used for this purpose. The curing agents can be catalysts, that is, compounds which primarily catalyze the curing reaction, or hardeners, that is, compounds which, in the curing reaction, react with the epoxy resin. Suitable hardeners are primary and secondary polyamines, for example, m-phenylenediamine, 4,4'-methylenedianiline and the like, polyamides such as dicyandiamide and the like, polymercaptans, polycarboxylic acids or anhydrides thereof such as maleic anhydride endo-methylene tetra-hydrophthalic anhydride, phenolic novolac resins and the like. Suitable catalysts are tertiary amines such as benzyldimethylamine, the imidazoles, and the like, quaternary ammonium compounds, boron trifluoride complexes such as boron trifluoride etherate complex, boron trifluoride monoethylamine complex and the like. Primary and secondary amines can act as both hardeners and catalysts, i.e., as combined hardener-catalysts. Other suitable curing agents and relative amounts thereof suitable for use are described in U.S. Pat. 3,212,958.

Additional materials such as fillers, pigments, fibers, dyes and the like can also be added to the compositions of this invention.

In formulating the compositions of this invention, it is convenient, from a processing standpoint, to prepare a so-called resin portion and a so-called hardener portion and to then blend the portions together in a ball tumbler.

The compositions of this invention, as stated, can be formed into many useful articles, as for example, components useful for use in electrical and mechanical applications, such as component parts in electrical switches.

The following example further illustrates this invention.

EXAMPLE 1

Compositions, the formulations of which are noted below, in parts by weight, were prepared by forming a so-called resin portion and a so-called hardener portion, each portion being mixed on a two-roll mill, micropulverized and then blended in a ball tumbler using 2 parts by weight resin portion per 1 part by weight hardener portion.

The resultant compositions were then tested as noted.

RESIN PORTION

|  | Control | Composition A | Composition B |
| --- | --- | --- | --- |
| Epoxidized novolac | 100.00 | 100.00 | 100.00 |
| Silica | 108.60 | 108.60 | 108.60 |
| Calcium stearate | 0.5 | | |
| Stearyl alcohol | 0.5 | | |
| Polycaprolactone | | 1.0 | 5.0 |

HARDENER PORTION

|  | Control | Composition A | Composition B |
| --- | --- | --- | --- |
| Phenolic novolac | 84.0 | 84.0 | 84.0 |
| Silica | 72.4 | 72.4 | 72.4 |
| 2-ethyl imidazole | 1.5 | 1.5 | 1.5 |
| Calcium stearate | 1.0 | | |
| Stearyl alcohol | 1.0 | | |
| Polycaprolactone | | 2.0 | 10.0 |

TESTS

|  | Control | Composition A | Composition B |
|---|---|---|---|
| Spiral flow in inches | 20 | 23 | 2 |
| Heat distortion temperature in °C | 167 | 174 | 174. |

The phenolic novolac noted in Example 1 was a phenol-formaldehyde condensate having a molecular weight of about 600 and having six phenolic hydroxyl groups per molecule.

The epoxidized novolac noted in Example 1 was the polyglycidyl ether of the phenolic novolac described above. The epoxidized novolac had an epoxide equivalent weight of about 200.

The polycaprolactone of Example 1 was a homopolymer of epsilon caprolactone, having a molecular weight of about 10,000 and a reduced viscosity of 0.3.

The compositions noted in Table 1 were tested as to flow characteristics by the Spiral Flow Test described in detail in The Society of the Plastic Industry pamphlet EMM 1-66. The greater the Spiral Flow, the better the flow characteristics of the composition tested. A composition having a greater Spiral Flow has less tendency of forming "molding shorts." A "molding short" occurs when a composition thermosets before adequately filling the mold cavity during the molding cycle.

Also, the compositions of this invention, noted in Example 1 as Compositions A and B, which did not contain a conventional lubricant, had better mold release properties than Control 1 which contained a conventional lubricant, i.e., calcium stearate and stearyl alcohol.

What is claimed is:

1. A composition comprising a polyepoxide having an average of more than one epoxy group per molecule wherein the oxygen of the epoxy group is attached to vicinal carbon atoms, and in an amount of about 0.5 to about 50 percent by weight of a homopolymer of acyclic ester, said cyclic ester having the formula:

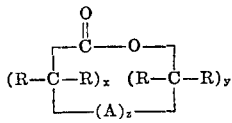

wherein R is hydrogen, halogen or a monovalent hydrocarbon radical containing a maximum of 12 carbon atoms, A is an oxy group; $x$ is an integer having a value of 1 to 4 inclusive; $y$ is an integer having a value of 1 to 4 inclusive; $z$ is an integer having a value of 0 or one; with the provisions that (a) the sum of $x+y+z$ is 4 to 6 inclusive and (b) the total number of R variables which are substituents other than hydrogen does not exceed 3, and wherein said homopolymer has a reduced viscosity of at least 0.1 and having been formed in presence of a hydroxyl initiator.

2. A composition as defined in claim 1 wherein the cyclic ester has the formula:

$$H-\overset{R}{\underset{O}{C}}-\overset{R}{\underset{R}{C}}-\overset{R}{\underset{R}{C}}-\overset{R}{\underset{R}{C}}-\overset{R}{\underset{R}{C}}-C=O$$

wherein R is as defined in claim 1 and wherein at least six R's are hydrogen.

3. A composition as defined in claim 1 wherein the cyclic ester is epsilon-caprolactone.

4. A composition as defined in claim 1 wherein said homopolymer has a reduced viscosity of about 0.15 to about 15.

5. A composition as defined in claim 1 which contains an epoxy curing agent.

6. A composition as defined in claim 5 wherein the epoxy curing agent is an epoxy hardener.

7. A composition as defined in claim 6 wherein the epoxy hardener is a phenolic hardener.

8. A composition as defined in claim 7 wherein the phenolic hardener is a phenolic novolac resin.

9. A composition as defined in claim 5 wherein the epoxy curing agent is an epoxy catalyst.

10. A composition as defined in claim 9 wherein the catalyst is an imidazole.

11. A composition as defined in claim 10 wherein the imidazole is 2-methyl imidazole.

12. A composition as defined in claim 1 wherein the polyepoxide is an epoxidized phenol-formaldehyde novolac resin and the homopolymer of a cyclic ester is a homopolymer of epsilon caprolactone.

13. A composition as defined in claim 1 wherein the said polymer is present in an amount of about 1 percent by weight to about 25 percent by weight.

14. A composition as defined in claim 1 wherein the polyepoxide is a polyglycidyl ether of a polyhydric phenol.

15. A composition as defined in claim 1 wherein the polyglycidyl ether is the diglycidyl ether of 2,2-bis(p-hydroxyphenyl)propane.

16. A composition as defined in claim 1 wherein the polyepoxide is an epoxidized phenol-formaldehyde novolac resin.

17. A composition as defined in claim 1 wherein the polyepoxide is bis(2,3-epoxycyclopentyl)ether.

18. The cured product of the composition defined in claim 1.

References Cited

UNITED STATES PATENTS

| 3,203,920 | 8/1965 | Nikles et al. | 260—830 |
| 3,222,312 | 12/1965 | Wyart et al. | 260—830 |
| 3,278,557 | 10/1966 | Chibnik | 260—830 |
| 3,382,210 | 5/1968 | Wyart et al. | 260—830 |
| 3,408,421 | 10/1968 | Kurka | 260—830 |
| 3,501,436 | 3/1970 | Avis et al. | 260—830 |

JOHN C. BLEUTGE, Primary Examiner

U.S. Cl. X.R.

260—37 EP, 831, 838

UNITED STATES PATENT OFFICE
CERTIFICATE OF CORRECTION

Patent No. 3,629,361  Dated December 21, 1971

Inventor(s) Anthony C. Soldatos

It is certified that error appears in the above-identified patent and that said Letters Patent are hereby corrected as shown below:

Column 7, line 4, "2" should read --29--;

line 5, "174." should read --174.5--;

line 39, "acyclic" should read -- a cyclic--

Column 8, line 38, in claim 15, "claim 1" should read --claim 14--

Signed and sealed this 15th day of August 1972.

(SEAL)
Attest:

EDWARD M. FLETCHER, JR            ROBERT GOTTSCHALK
Attesting Officer                      Commissioner of Patents